United States Patent [19]

Godlewski et al.

[11] Patent Number: 4,481,322

[45] Date of Patent: Nov. 6, 1984

[54] NOVEL REINFORCING ADDITIVE AND METHOD OF REINFORCING THERMOPLASTIC POLYMER THEREWITH

[75] Inventors: Robert E. Godlewski, Mahopac; Frederick D. Osterholtz, Pleasantville, both of N.Y.

[73] Assignee: Union Carbide Corporation, Danbury, Conn.

[21] Appl. No.: 480,498

[22] Filed: Mar. 30, 1983

[51] Int. Cl.³ .............................................. C08K 5/54
[52] U.S. Cl. ................................... 524/265; 523/200; 523/202; 523/215; 523/216; 524/449; 524/580; 524/583; 524/730; 524/731; 525/479; 526/194; 526/209; 526/279; 526/333
[58] Field of Search ............... 524/265, 449, 730, 731, 524/583, 580; 523/200, 202, 215, 216; 525/479; 526/194, 209, 279, 333

[56] References Cited

U.S. PATENT DOCUMENTS

| | | | |
|---|---|---|---|
| 3,471,439 | 10/1969 | Bixler | 523/202 |
| 3,773,708 | 11/1973 | Takahashi et al. | 524/427 |
| 3,868,347 | 2/1975 | Sabel et al. | 524/789 |
| 3,969,313 | 7/1976 | Aishima et al. | 524/427 |
| 4,069,378 | 1/1978 | DeMarco | 526/320 |
| 4,104,289 | 8/1978 | Jones | 428/407 |
| 4,129,549 | 12/1978 | Kahane | 524/789 |
| 4,172,101 | 10/1979 | Getson | 528/33 |
| 4,188,451 | 2/1980 | Humphrey | 428/331 |
| 4,287,227 | 9/1981 | Kamada et al. | 428/442 |
| 4,317,765 | 3/1982 | Gaylord | 524/452 |
| 4,333,970 | 6/1982 | Blommers et al. | 526/347 |
| 4,385,136 | 5/1983 | Ancker et al. | 523/216 |

*Primary Examiner*—Herbert J. Lilling
*Attorney, Agent, or Firm*—Paul W. Leuzzi, II

[57] ABSTRACT

Integrally blended additives, consisting of a ternary mixture of gamma methacryloxypropyl trimethoxysilane, trimethylolpropane triacrylate and a siloxaneoxyalkylene block copolymer, in the absence of dicumyl peroxide do not consistently improve the mechanical properties of mica filled polyolefins. This is especially true under "low shear" melt processing conditions e.g. employing a conventional screw design in a single barrel extruder. However, when the ternary mixture is combined with a small amount of dicumyl peroxide (neat or dissolved in vinyltrialkoxy silane) there is a consistent improvement in composite mechanical properties above that of the composites containing the ternary mixture alone and in comparison to mica filled polyolefin composites without any additive or composites containing the peroxide alone. Furthermore, thermal aging tensile strength retention is improved in mica filled polypropylene composites containing the ternary mixture combined with dicumyl peroxide.

18 Claims, No Drawings

NOVEL REINFORCING ADDITIVE AND METHOD OF REINFORCING THERMOPLASTIC POLYMER THEREWITH

BACKGROUND OF THE INVENTION

1. Field of the Invention

This invention relates to filled polymeric masses and more particularly relates to filled thermoplastic polymer matrixes and to additives integrally added to the filler thermoplastic polymer blend for conserving or enhancing the physical properties of the filled thermoplastic polymer including improved impact strength. The invention also relates to novel integral additives for addition to filler thermoplastic polymer blends for providing improved processing characteristics to the blend such as lower pressures required to fill molds in an injection molding operation. The invention also provides methods for producing reinforced or filled thermoplastic polymers of improved physical properties and relates to the resulting improved filled thermoplastic polymers.

2. Description of the Prior Art

A very extensive amount of research has been performed on the treatment of fillers or reinforcing agents for synthetic polymers including thermoplastic polymers such as polyethylene, polypropylene and the like.

Most recently, U.S. Ser. No. 295,812 filed on Aug. 27, 1981 taught the synergistic result of blending a thermoplastic organic polymer with an inorganic filler, a polymerizable unsaturated organic compound, a vinyl-polymerizable unsaturated hydrolyzable silane and a surfactant. The general teachings of the art prior to this invention had generally discouraged the addition of surfactants to polymer-filler blends. Although this blend resulted in certain improvements in the physical and processing properties of the resultant filled thermoplastic polymer matrix, there continues a need for even greater improvements in these physical and processing characteristics.

Prior to the conception of U.S. Ser. No. 298,812 it had been known to employ free radical generators to decrease the duration and/or amount of melt processing necessary to obtain desirable results. U.S. Pat. No. 3,471,439 particularly points out the advantages that a free radical generator can lend to a reinforcing filler. This inference fails however to teach or suggest the use of a surfactant in the filled thermoplastic polymer matrix.

Other references of interest include U.S. Pat. No. 4,104,289 which teaches the use of trivinylisocyanurate with peroxide to improve the mechanical properties of filled polyethylene. U.S. Pat. No. 3,556,754 which teaches the use of a vinyl-polymerizable unsaturated hydrolyzable silane with a siloxane oxyalkylene block copolymer as a glass treatment and how compounding with a resin in the presence of a peroxide produces superior molded composites. U.S. Pat. No. 3,806,555 which discloses the crosslinking of an olefin polymer or copolymer in the presence of peroxide. U.S. Pat. No. 4,317,765 which describes the mixing of a polyolefin, a filler, maleic anhydride and a peroxide to form a composite having improved mechanical properties.

None of the prior art references identified above disclose or suggest any method that involves the synergistic results obtained by the addition of a surfactant of the type described herein with a free radical generator to a mixture of thermoplastic polymer, blending additives, and filler for the purpose of improving processing characteristics such as pressure-to-fill requirements and conserving or enhancing physical properties.

SUMMARY OF THE INVENTION

The present invention provides a novel method of reinforcing a thermoplastic organic polymer which comprises blending said thermoplastic organic polymer with a reinforcing filler mixture comprising of: (a) from 80 to 99 weight percent of an inorganic filler; (b) from 0.05 to 15 weight percent of a polymerizable unsaturated organic compound having at least two polymerizable unsaturation groups; (c) from 0.05 to 5 weight percent of a vinyl polymerizable unsaturated, hydrolyzable silane; (d) from 0.05 to 2.5 weight percent of a surfactant comprising either a siloxane containing at least one silicon-bonded alkyl group having at least 12 carbon atoms or a polyoxyalkylene compound having one or more polyoxyalkylene blocks each bonded at one end to a siloxane block, an alkyl group having at least 12 carbon atoms, or an alkenyl group, and bonded at the other end to an alkoxy group, siloxane block or a hydroxy group; and (e) from 0.0025 to 2.5 weight percent of a free radical generator to form a substantially homogeneous mixture.

This novel method results in unexpected and synergistic benefits in the physical and processing characteristics of the resultant filled thermoplastic polymer matrix. These results are particularly noticeable in the enhancement of the impact and tensile strength.

The present invention also provides a novel reinforcing additive for improving the physical properties of filler/polymer blends. These blends are useful in the novel method and represent a true advance in the art of filled thermoplastic polymer blends.

DETAILED DESCRIPTION OF THE INVENTION

In accordance with the present invention there is provided a novel method of reinforcing a thermoplastic organic polymer. As stated earlier the method comprises blending the thermoplastic organic polymer with a reinforcing filler mixture.

The blend of reinforcing filler mixture and polymeric matrix, e.g., the thermoplastic organic polymer, can be blended at ambient temperatures in a suitable mixing apparatus, such as a Hobart mixer, to uniformly distribute the components throughout the matrix. If desired, the polymerizable unsaturated organic compound having at least two polymerizable unsaturation groups, the vinyl polymerizable unsaturated, hydrolyzable silane, the surfactant and the free radical generator (collectively referred to hereinafter as the reinforcing additives) can be incorporated into the filler by ordinary mixing without the need for a high shear operation or it can be mixed with the polymeric matrix which is in granular or powdered form. All of these mixing operations can be performed at any convenient time or point in the formulation procedure. The reinforcing additives can also be added to the polymeric matrix before, during or after its formation by polymerization. The reinforcing additives can be added to the coarse filler material as it is received from the mine and such addition can be performed before, during or after grinding of the filler to the desired particle size. An advantage of this invention is that the point of addition of the reinforcing additives can be conducted at the most convenient and economical point in the overall formulation procedure including additions as pointed out above to the starting materials prior, during or after their formation or processing.

Integral blending of the additives has a substantial economic advantage over a pre-treated filler which involves savings in time and energy, and provides convenience and simplicity. Pre-treatment of a filler with an additive, e.g. a coupling agent, is a separate operation requiring a high intensity mixer like a Henschel or twin-shell blender equipped with a revolving high RPM intensifier mixing blade to prevent agglomeration. The reinforcing additives must be added slowly at a steady flow rate to prevent agglomeration. During the pre-treatment step, localized high temperatures are encountered at or near the high speed mixing blades of the equipment employed. This prevents introducing a resin to the filler because the resin would melt and result in agglomeration.

In utilizing the integral blending technique, the reinforcing additives must be capable of dispersing the filler and the reinforcing additives must also be capable of being uniformly distributed throughout the filler. This prevents agglomeration. In integral blending according to this invention, the reinforcing additives can be added rapidly (one-shot) to the filler or filler/resin mixture followed by gentle agitation. Low level usage of the reinforcing additives, while still maintaining benefits of the reinforcing additives, is a substantial and unexpected advantage of this invention. Furthermore, the reinforcing additives can be integrally blended according to this invention directly into the processing equipment (e.g., Banbury) containing the filler/resin mixture and prior to the fluxing stage of the melt composite. For these reasons integral blending is a preferred embodiment of the present invention.

The polymeric matrixes to which this invention is applied include any of the rubbers, resins or plastics with which fillers are conventionally employed. Such polymers include natural rubber; synthetic rubbers such as styrene-butadiene rubber; ethylene-propylene terpolymer rubber; urethane rubbers; polyolefins such as polyethylene, polypropylene, and polyisobutylene; poly-acrylonitrile; polybutadiene; copolymers of butadiene and acrylonitrile; polystyrene; poly(styrene acrylonitrile); copolymers of styrene with butadiene and acrylonitrile; copolymers of ethylene with propylene or butene-1 or vinyl acetate or maleic anhydride; polycarbonate resins; phenoxy resins, polyvinyl chloride; copolymers of vinyl chloride with vinyl acetate or other vinyl esters; polyvinyl acetate; linear polyesters; polyvinyl acetals; polyvinylidene chloride; copolymers of vinylidene chloride with vinyl chloride and acrylic acid; poly(methyl methacrylate); superpolyamides, e.g. nylons; polysulfones; alkyl resins such as a polymer of dialkyl phthalate; epoxy resins, phenolic resins; silicone resins; polyester resins including alkyl resins; poly(vinylacetate-vinyl chloride); poly (vinylidene chloride); thermoplastic polyurethanes; thermoplastic polyhydroxy ethers; thermoplastic polyesters; poly (vinyl chloride-maleic anhydride); and others. Preferred polymers are the thermoplastic polymers, such as the polyolefins, e.g., polyethylene, polypropylene, ethylenepropylene rubber, ethylene propylenediene monomer, and the like or blends thereof. The invention can be used in thermoset resins.

Fillers used in the polymeric matrix are known to those skilled in the art and include any suitable finely divided or particulate inorganic substance. At the time of incorporation into the polymeric matrix most fillers may be in the form of finely divided particles. They may be approximately isometric, having a maximum diameter, i.e., a maximum linear dimension of ten microns, preferably five microns; or they may be in the form of plates or needles (fibers) having a thickness or diameter of ten microns or less, preferably five microns or less. The minimum size of the filler particles is not critical, any of the conventionally used fillers being suitable in this respect. Among the specific fillers which may be used in the present invention are asbestos, ground glass, kaolin and other clay minerals, silica, calcium silica, calcium carbonate (whiting), magnesium oxide, barium carbonate, barium sulfate (barytes), metal fibers and powders, glass fibers, refractory fibers, non-reinforcing or reinforcing carbon blacks, titanium dioxide, mica, talc, chopped glass, alumina, quartz, wollastonite (calcium silicate), and inorganic coloring pigments. The preferred filler is mica.

Polymerizable unsaturated organic compounds having at least two polymerizable unsaturated groups useful in the present invention include any organic compound of this description which does not contain any group or element which would adversely affect the function of the polymeric matrix, e.g., the thermoplastic polymer; the filler; the vinylpolymerizable unsaturated, hydrolyzable silane; or any other component such as stabilizers, antioxidants that customarily may be used in the matrix. Suitable unsaturated organic compounds include ester diol 2,4-diacrylate, 1,4 butylene glycol diacrylated, diethylene glycol dimethacrylate, triallyl-s-triazine-2,4,6-(1H, 3H, 5H)-trione, triallyl mellitate, pentaerythritol triacrylate, polycaprolactone triacrylate, m-phenylene bis maleimide, dipentaerythritol pentaacrylate, melamine triacrylate, epoxidized linseed oil/acrylate, triacryloyl hexahydro-s-triazine, trimethylolpropane trimaleate, trimethacryloyl hexahydro-s-triazine, N,N-tetraacryloyl 1,6-diaminopyridine, 1,3-butylene glycol dimethacrylate, 1,3-nutylene glycol diacrylate, ethylene glycol dimethacrylate, ethylene glycol diacrylate, diethylene glycol diacrylate, triethylene glycol diacrylate, polyethylene glycol dimethacrylate, polyethylene glycol diacrylate, trimethylol propane trimethacrylate, trimethylol propane triacrylate, divinyl sulfone, dicyclopentadiene, bisalkyl glycol dicarbonate, triallyl cyanurate, acetyl triallyl citrate, divinyl benzene, dialkyl phthalate, tetraallyl methylenediamine, tetraallyl oxyethane, 3-methyl-1,4,6-heptatriene; 1-10-decamethylene glycol dimethacrylate, di-, tri-, tetra-, and penta-acrylates of poly(vinyl alcohol), and the like. In addition, the following low molecular weight, polyunsaturated polymers may be used: polybutadiene oligomers, hydroxyl terminated polybutadiene oligomers, hydroxyl terminated styrene-butadiene and acrylonitrilebutadiene oligomers, unsaturated polyesters, partial alkylic esters of styrene-maleic anhydride oligomers and the like.

It is preferred to employ polymerizable unsaturated organic compounds that have a high unsaturated level to molecular weight ratio. Therefore, the tri-, tetra-, and penta-acrylates of poly(vinyl alcohol) and the other tri-, tetra-, and penta-acrylates and methacrylates of polyols such as pentaerythritol, methylolpropane and dipentaerythritol as described hereinabove are preferred.

The vinyl-polymerizable unsaturated, hydrolyzable silanes used in this invention contain at least one silicon-bonded hydrolyzable group, e.g., alkoxy, halogen, acryloxy, and the like, and at least one silicon-bonded vinyl-polymerizable unsaturated group such as, vinyl, gamma-methacryloxypropyl, alkenyl gamma-acryloxypropyl, 6-acryloxyhexyltriethoxysilane, alkyloxypropyl, ethynyl, 2-propynyl and others, and preferably is an ethylenically unsaturated group. Any remaining valences of silicon not satisfied by a hydrolyzable group or a vinyl-polymerizable unsaturated group being satisfied by a monovalent hydrocarbon group, such as methyl, ethyl, propyl, isopropyl, butyl, pentyl, isobutyl, isopentyl, octyl, decyl, cyclohexyl, cyclopentyl, benzyl, phenyl, phenylethyl, naphthyl, and the like. Suitable silanes of this type include those represented by the formula:

$$R_a SiX_b Y_c$$

wherein R is a monovalent hydrocarbon group, X is a silicon-bonded hydrolyzable group, Y is a silicon-bonded monovalent organic group containing at least one vinylpolymerizable unsaturated bond, a is an integer of 0 to 2, preferably 0; b is an integer of 1 to 3, preferably 3; c is an integer of 1 to 3, preferably 1; and $a+b+c$ is equal to 4.

Suitable vinyl polymerizable unsaturated hydrolyzable silanes that can be used in this invention include vinyltriethoxysilane, gamma-methacryloxypropyl-trimethoxysilane, vinyltri(2-methoxyethoxy) silane, vinyltrimethoxysilane, vinyltrichlorosilane, gamma-meth-acryloxypropyltri(2-methoxyethoxy)silane, gamma-acryl-oxypropyltriethoxysilane, vinyltriacetoxysilane, ethynyltriethoxysilane, $$(CH_2\!=\!CH\overset{O}{\overset{\|}{C}}OCH_2)_3CCH_2OSiCl_3$$

$$(CH_2\!=\!CH\overset{O}{\overset{\|}{C}}OCH_2)_3CCH_2OSi(OMe)_3,$$

$$(CH_2\!=\!C\overset{O}{\overset{\|}{C}}OCH_2)_3CCH_2OCH_2C\!-\!\underset{CH_3}{}$$

$$(CH_2\!=\!C\overset{O}{\overset{\|}{C}}OCH_2)_2CH_2OSi(OMe)_3,\ \underset{CH_3}{}$$

$$(CH_2\!=\!C\overset{O}{\overset{\|}{C}}OCH_2)_2(HOCH_2)CCH_2\!-\!\underset{CH_3}{}$$

$$OCH_2C(CH_2O\overset{O}{\overset{\|}{C}}C\!=\!CH_2)_2CH_2OSi(OEt)_3,\ \underset{CH_3}{}$$

2-propynyltrichlorosilane, and others. It is believed that the silicon-bonded hydrolyzable groups of the silanes react via hydrolysis with groups such as hydroxy group or water contained by the fillers to more strongly attach the silane to the filler. In addition, the silanes containing higher amounts (ratios) of unsaturated group level to molecular weight are preferred. For example, the tri-, tetra-, or penta-acrylate or methacrylate derivatives of pentaerythritol or dipentaerythritol can be reacted with trichlorosilane or tetrachlorosilane to provide silanes having high ratios of unsaturated group level to molecular weight. Relatively low molecular weight polysiloxane oligomers such as the poly(methylvinylsiloxane) tetramer can be used in place of the polymerizable unsaturated hydrolyzable silane. If a particular unsaturated polymerizable hydrolyzable silane or for that matter a particular polymerizable unsaturated organic compound is too volatile, another one can be easily substituted. If volatitility is a problem it is also possible to reduce the volatility and eliminate the problem by reaction of the silane or organic compound with the filler prior to mixing it with the polymer and processing same.

Relatively low molecular weight vinyl-polymerizable unsaturated polysiloxane oligomers that can be used in place of or in addition to the vinyl-polymerizable unsaturated, hydrolyzable silanes and can be represented by the average formula:

$$R_g[R_dY_{2-d}SiO]_e[R_2SiO]_f[SiR_3]_g$$

wherein R and Y are as defined hereinabove, d is an integer of 0 or 1, e is an integer of 1 to 4, f is an integer of 0 to 3, g is an integer of 0 to 1, $e+f+g$ is an integer of 1 to 5, and d can be the same of different in each molecule. The oligomers covered by this formula include the cyclic trimers, cyclic tetramers and the linear dimers, trimers, tetramers and pentamers.

The vinyl-polymerizable unsaturated silicon compounds, thus, contain one to 5 silicon atoms, interconnected by $\equiv$SiOSi$\equiv$ linkages when said compounds contain multiple silicon atoms per molecule, contain at least one silicon-bonded vinyl-polymerizable unsaturated group and are hydrolyzable, in the case of silanes, by virtue of at least one silicon-bonded hydrolyzable group. Any valences of silicon not satisfied by a divalent oxygen atom in a $\equiv$SiOSi$\equiv$ linkage, by a silicon-bonded hydrolyzable group or by a silicon-bonded vinyl-polymerizable unsaturated group is satisfied by a monovalent hydrocarbon group free of vinyl-polymerizable unsaturation. The vinyl-polymerizable unsaturated, hydrolyzable silanes are preferred in most cases.

It is a further advantage of this invention that the polymerizable unsaturated hydrolyzable silane and organic compound do not need to be matched to the particular type of fillers, e.g. acid or base types, as need be done by prior art pre-treatment procedures such as that disclosed in U.S. Pat. No. 3,471,439. Selections can thus be made from a wider variety of polymerizable unsaturated hydrolyzable silanes and organic compounds.

Surfactants that are useful in the present invention include polysiloxanes containing per molecule at least one silicon-bonded alkyl group of at least 12 carbon atoms, as generally represented by the average formula:

$$R_3SiO[R_2SiO]_x[R_w(C_nH_{2n+1})_{2-w}SiO]_ySiR_3$$

wherein R is monovalent hydrocarbon of 1 to 12 carbon atoms, preferably methyl, n is an integer of at least 12 and preferably not more than 24, w is an integer of 0 or 1, preferably 1, x is an integer of at least 1, preferably 10 or more, and y is an integer of 1 or more, preferably at least 10. R, w and n can be the same or different throughout each molecule.

Additional surfactants useful in this invention are the polyoxyalkylene compounds having one or more polyoxyalkylene blocks each bonded at one end to a siloxane block, an alkyl group having at least 12 carbon atoms, or an alkenyl group, and bonded at the other end to an alkoxy group, a siloxane block or a hydroxy group.

These surfactants include the "hydrolyzable: polysiloxane-polyoxyalkylene block copolymers such as the block copolymers described in U.S. Pat. Nos. 2,834,748 and 2,917,480 (disclosures incorporated by reference) and the "non-hydrolyzable" polysiloxane-polyoxyalkylene block copolymers such as the block copolymers described in U.S. Pat. Nos. 3,505,377 and 3,686,254, and British Pat. No. 1,220,471 (disclosures incorporated by reference). These various polysiloxane-polyoxyalkylene block copolymers preferably contain from 5 to 50 weight percent of polysiloxane polymer with the remainder being polyoxyalkylene polymer.

A preferred class of polysiloxane-polyoxyalkylene block copolymers are those represented by the average formula:

$$R_3SiO[R_2SiO]_s[R'SiO]_tSiR_3$$
$$\underset{(C_mH_{2m}O)_pR'}{|}$$

wherein R' is a monovalent hydrocarbon group having 1 to 18 carbon atoms or an alkanoyl group having 1 to 18 carbon atoms, R is as defined above, s is an integer of 1 or more, preferably 1 to 100, t is an integer of 1 or more, preferably 1 to 100, m is an integer of 2 or more, preferably 2 or 3, p is an integer of 2 or more, preferably 2 to 40, and R, R', m, and p may be the same or different throughout the same molecule.

Additional polyoxyalkylene surfactants useful in this invention can be represented by the average formula:

$$R''O(C_mH_{2m}O)_pR'''$$

wherein R'' is an alkyl group of at least 12 carbon atoms, preferably 12 to 18 carbon atoms or an alkenyl group having 2 or more carbon atoms, preferably 3 to 18 carbon atoms, such as, alkyl, R''' is hydrogen, alkyl having 1 to 18 carbon atoms or alkanoyl having 1 to 18 carbon atoms, and m and p are as defined above and can be the same or different throughout the same molecule.

Useful surfactants also can include polyoxyalkylene polyols of a wide range of molecular weights such as polyoxyethylene glycol, polyoxypropylene glycol, or polyoxyethylenepolyoxypropylene glycol in which the ethyleneoxy groups and propyleneoxy groups are randomly distributed in the molecular chain or in which blocks of two or more ethyleneoxy groups are connected to blocks of propyleneoxy groups. Liquid surfactants are preferred over solid surfactants.

The polysiloxane-polyoxyalkylene block polymer surfactants are preferred. The polyoxyalkylene chains or blocks can comprise all the alkyleneoxy units or all propyleneoxy units or units of both randomly dispersed throughout the block or assembled into sub-blocks of ethyleneoxy units and sub-blocks of propyleneoxy units. Preferred polysiloxane-polyoxyalkylene block copolymers are those having the higher molecular weight polysiloxane blocks.

In the polysiloxane surfactants including the polysiloxane-polyoxyalkylene block copolymer surfactants suitable for use in this invention, any valences of silicon not satisfied by a divalent oxygen of a $\equiv$SiOSi$\equiv$ linkage or by a polyoxyalkylene block through a $\equiv$SiC$\equiv$ or $\equiv$SiOC$\equiv$ linkage is satisfied by a monovalent hydrocarbon group having at least one carbon atoms and preferably 1 to 18 carbon atoms. Thus, the surfactants are not limited to any molecular configuration and can be linear, branched, cyclic, etc.

Most free radical generators are useful in the present invention. The free radical generator may have a half-life as low as 1.5 seconds at 130° C. and as high as ten (10) hours at 130° C. Usually, however, it is preferable to employ a free-radical generator with a half-life of no greater than thirty (30) minutes at 130° C. When free radical generators are employed having longer half-lifes than thirty minutes at 130° C. it is desirable to employ a decomposition promoter such as cobalt or manganese organosalts, tertiary amines, or mercaptans. Among the most useful free radical generators are dicumyl peroxide, lauroyl peroxide, azobisisobutyronitrile, benzoyl peroxide, tertiary butyl perbenzoate, di(tertiary-butyl) peroxide, cumene hydroperoxide, 2,5-dimethyl-2,5-di(t-butyl-peroxy) hexane, 2,5-dimethyl-2,5-di(t-butyl-peroxy) hexane, tertiary butyl hydroperoxide, isopropyl percarbonate, and the like.

The amount of reinforcing filler blended with the thermoplastic organic polymer may vary over a wide range depending upon the particular end-use application. Usually the reinforcing filler mixture is at least five (5%) percent by weight, of the filled thermoplastic polymer blend to obtain a substantial effect on the physical and processing characteristics. It is rarely desirable that the reinforcing filler mixture exceed eighty-five (85%) percent by weight of the filled thermoplastic polymer blend. Of the reinforcing filler mixture, the reinforcing additives may vary from about 1 to 25 weight percent, the remainder being the inorganic filler. Of the reinforcing additives, the polymerizable unsaturated organic compound having at least two polymerizable unsaturation groups is present in an amount from about 0.05 to 15 weight percent, based on the weight of the reinforcing filler mixture; the vinyl-polymerizable unsaturated hydrolyzable silane is present in an amount from about 0.05 to 5 weight percent, based on the weight of the reinforcing filler mixture; the surfactant is present in an amount from about 0.05 to 2.5 weight percent, based on the weight of the reinforcing filler mixture; and the free radical generator is present in an amount from about 0.0025 to 2.5 weight percent, based on the weight of the reinforcing filler mixture. Within these limits the preferred amount of each component will depend largely upon the choice of components in general and the specific end use application. For these reasons further limitations of the ratio of components to one another cannot be provided without detracting from the spirit of the present invention.

In addition to the additives, previously discussed in detail, other ingredients conventionally used in such compositions may also be incorporated. These include, where appropriate, platicizers, vulcanizing agents, crosslinking agents, dyes, pigments, and the like. Of particular interest is the employment of what are known as interfacial agents for use in conjunction with the surfactant. Mixtures of a surfactant and at least two interfacial agents as disclosed and claimed in U.S. Ser. No. 295,813 filed on Aug. 27, 1981 and entitled "Synergistic Reinforcement Promoter Systems For Filled Polymers" can be particularly useful. The resulting mixtures of surfactant and interfacial agents are desirable in certain filled thermoplastic polymer blends. When employed the combined amount of interfacial agents should be about 5 to 95 weight percent of the combined weight of the interfacial agents and surfactant.

Whereas the exact scope of the instant invention is set forth in the appended claims, the following specific examples illustrate certain aspects of the present invention and, more particularly, point out methods of evaluating the same. However, the examples are set forth for illustration only and are not to be construed as limitations on the present invention except as set forth in the appended claims. All parts and percentages are be weight unless otherwise specified.

NOMENCLATURE

The following designations used in the Examples and elsewhere herein have the following meanings:

HDPE—High density polyethylene having a melt index of 6(ASTM D 1328 condition G) made by the low pressure process PP-PL—Polypropylene (Hercules, Inc, Pro-Fax 6253), an isotactic homopolymer containing a proprietary stabilizer package. P1 designates pellet form. It has a nominal 4 melt index (ASTM D-1238, condition L)

PP-PM—Polypropylene (Hercules, Inc., Pro-Fax 6253), an isotactic homopolymer containing a proprietary stabilizer package. PM designates Pre-Mix in powdered form. It has a nominal 4 melt index (ASTM D-1238, condition L)

MICA (200HK)—a Suzorite ™ Mica from Marietta Resources Ltd. This is a phlogopite material having an average particle size of 85 microns.

MICA (60S)—a Suzorite ™ Mica and from Marietta Resources Ltd. This is a phlogopite material having an average particle size of 290 microns.

MAPTS—gamma-methacryloxypropyltrimethoxysilane $$CH_2=C(CH_3)-C(=O)-O(CH_2)_3Si(OCH_3)_3$$

VTS—Vinyltriethoxysilane, $$CH_2=CHSi(OC_2H_5)_3$$

TTA—Trimethylol propane triacrylate, $$CH_2=CH-C(=O)-OCH_2-C(CH_3)(CH_2-O-C(=O)-CH=CH_2)(CH_2-O-C(=O)-CH=CH_2)$$

Surfactant I—

$$CH_3-SiO(CH_3)_2-[SiO(CH_3)_2]_{13}-[SiO(CH_3)(C_3H_6O(C_2H_4O)_{7.5}H)]_{5.5}-Si(CH_3)_3$$

FRG I—a 40% dicumyl peroxide on $CaCO_3$ carrier.
ADDITIVE I—a mixture of MAPTS/TTA/Surfactant I in a 1/1/0.3 weight ratio
ADDITIVE II—a mixture of FRG II dissolved in VTMS
ADDITIVE III—a mixture of MAPTS/TTA/Surfactant I in a 1/1/0.7 weight ratio.
FRG II—8% dicumyl peroxide on $CaCO_3$ carrier STABILIZER I—a stabilizer concentrate from Hercules, Inc. Loading of 1.5 phr is recommended for filled polypropylene composites
psi—pounds per square inch
%—percent by weight unless otherwise specified
g—grams
wt—weight
parts—parts by weight unless otherwise indicated
pts—parts by weight unless otherwise indicated
pbw—parts by weight
ppm—parts by wt. per million parts by wt.
Ft-lbs/in—ft. pounds per inch
In-lbs/in—inch pounds per inch
phr—parts per hundred resin (polymer), by weight
HDT @ 264 psi ASTM D648
Pre-Treated—Method of applying silane or other liquids to treat or coat finely divide filler prior to adding to thermoplastic.
Integral Addition—The simple incorporation of liquid or solid additives to a mixture of filler/resin while agitating the mixture. Hobart mixer, Henschel mixer, ribbon blender or drum tumbler are typically employed.

TEST PROCEDURES

Tensile @ Break ASTM D638 (0.2 in/min. or 2 in/min. extension rate)
Flexural yield strength-ASTM D790 (0.05 in/min. rate)
Tangent Flexural Modulus-ASTM D790 (0.05 in/min. rate)
HDT @ 264 psi ASTM D648
Izod Impact Strength—ASTM D256
Gardner Impact—Described in *Materials Engineering*, Nov. 1973, under title "Gardner Impact vs. Izod—Which is Better for Plastics?" by V. Abolins, G. E. Corp.
Melt Index—ASTM D-1238 condition F

MELT PROCESSING CONDITIONS

The melt processing conditions employed in comparative examples A to Z and in examples 1 through 22 can be classified as under "low shear" conditions. An example of "low shear" conditions would be the employment of a single screw extruder equipped with a conventional screw geometry.

COMPARATIVE EXAMPLES A-Z

Comparative Examples A-Z exemplify the mechanical properties of various composites that were Banbury processed followed by injection molding of the test specimens and which employ one or more of the components of the reinforcing filler mixture but not all the components. Test results are set forth in Tables I-XII. Of particular note is that comparative Example A contains no additives, comparative Example F is substantially what is taught by U.S. Pat. No. 3,471,439 and comparative Example 6 is substantially what is taught in U.S. Ser. No. 295,812.

EXAMPLES 1-22

Following the procedure of comparative examples A-Z, a filled thermoplastic polymer blend of the present invention is employed. Compared to the preceding Comparative Examples these Examples have the higher Gardner and Notched Izod impact strength at no sacrifice in tensile strength. Test results are shown in Tables I-XIII.

TABLE I

| EXAMPLE | A | B | C | D | E | F | G | 1 |
|---|---|---|---|---|---|---|---|---|
| HDPE | 100 | 100 | 100 | 100 | 100 | 100 | 100 | 100 |
| Mica (Grade 200HK) | 67 | 67 | 67 | 67 | 67 | 67 | 67 | 67 |
| MAPTS | — | — | — | — | 0.5 | 0.5 | 0.5 | 0.5 |
| TTA | — | — | — | — | 0.5 | 0.5 | 0.5 | 0.5 |
| Surfactant I | — | — | 0.5 | 0.5 | — | — | 0.5 | 0.5 |
| FRG - I | — | 0.25 | — | 0.25 | — | 0.25 | — | 0.25 |
| Tensile @ Break, psi | 3460 | 3790 | 3310 | 3640 | 4840 | 5190 | 3930 | 5340 |
| Elongation @ Break, % | 18 | 9 | 15 | 10 | 13 | 8 | 13 | 8 |
| Gardner Impact Strength, in-lbs/in. | 148 | 132 | 148 | 115 | 148 | 132 | 148 | 165 |
| Notched Izod Impact Strength, ft-lbs/in. | 1.26 | 1.42 | 1.42 | 1.34 | 1.42 | 1.59 | 1.59 | 2.15 |
| Melt Index @ 190° C., g/10 min. | 36.3 | 31.3 | 35.8 | 23.2 | 31.6 | 3.4 | 19.2 | 1.05 |

TABLE II

50% Mica Filled Polypropylene Composites

| EXAMPLE | H | I | J | 2 | 3 | 4 | 5 |
|---|---|---|---|---|---|---|---|
| PP-PM | 100 | 100 | 100 | 100 | 100 | 100 | 100 |
| Mica (Grade 200HK) | 100 | 100 | 100 | 100 | 100 | 100 | 100 |
| ADDITIVE I | — | — | 2.0 | 2.0 | 2.0 | 2.0 | 2.0 |
| FRG I | — | 0.25 | — | 0.02 | 0.06 | 0.125 | 0.25 |
| Tensile @ Break[1] psi | 4300 | 4300 | 4600 | 5330 | 6420 | 6050 | 7200 |
| Flexural Yield Strength, psi | 7400 | 7400 | 7800 | 9500 | 9400 | 9100 | 11600 |
| Notched Izod Impact Strength, Ft/Lbs/in. | 0.13 | 0.10 | 0.12 | 0.28 | 0.17 | 0.18 | 0.22 |

[1] tested @ 2 in/min. rate

TABLE III

50% Mica Filled Polypropylene Composites

| EXAMPLES | K | L | 6 | 7 |
|---|---|---|---|---|
| PP-PM | 100 | 100 | 100 | 100 |
| Mica (Grade 200HK) | 100 | 100 | 100 | 100 |
| ADDITIVE I | — | — | 1.0 | 2.0 |
| FRG I | — | 0.25 | 0.25 | 0.25 |
| Tensile @ Break[1] psi | 4300 | 4300 | 7070 | 7200 |
| Flexural Yield Strength, psi | 7400 | 7400 | 10600 | 11600 |
| Tangent Flexural Modulus, psi × 10³ | 1430 | 1230 | 1150 | 1420 |

[1] Tested @ 2 in/min

TABLE IV

50% Mica Filled Polypropylene Composites

| EXAMPLES | L | 8 | 9 | 10 |
|---|---|---|---|---|
| (Heat Aging @ 150° C.) | | | | |
| PP-PM | 100 | 100 | 100 | 100 |
| Mica (Grade 200HK) | 100 | 100 | 100 | 100 |
| Additive I | — | 1.0 | 2.0 | 2.0 |
| FRG I | — | 0.125 | 0.125 | 0.25 |
| Before Heat Aging | | | | |
| Tensile @ Break[1] psi | 3900 | 6920 | 5530 | 6500 |
| After Heat Aging 1 Week @ 150° C. | | | | |
| Tensile @ Break[3] psi | 1480 | 6900 | 6780 | 6850 |
| After Heat Aging 2 Weeks @ 150° C. | | | | |
| Tensile @ Break[3] psi | 530 | 3590 | 4390 | 4720 |

[1] Tested @ 2 in/min. rate.

TABLE V

50% Mica Filled Polypropylene Composites

| EXAMPLES | M | N | 11 |
|---|---|---|---|
| PP-PM | 100 | 100 | 100 |
| Mica (Grade 200HK) | 100 | 100 | 100 |
| Additive I | — | 1.0 | 1.0 |
| Additive II | — | — | 0.25 |
| Tensile @ Break[1] psi | 4480 | 5620 | 6540 |
| Flexural Yield Strength, psi | 6920 | 8470 | 10040 |
| Tangent Flexural Modulus, psi × 10³ | 1300 | 1180 | 1380 |

[1] Tested @ 2 in/min. rate.

TABLE VI

50% Mica Filled Polypropylene Composites

| EXAMPLES | O | P | 12 |
|---|---|---|---|
| (Heat Aging @ 150° C.) | | | |
| PP-PM | 100 | 100 | 100 |
| Mica (Grade 200HK) | 100 | 100 | 100 |
| Additive I | — | 1.0 | 1.0 |
| Additive II | — | — | 0.25 |
| Before Heat Aging | | | |
| Tensile @ Break psi | 4480 | 5620 | 6540 |
| After Heat Aging 1 Week @ 150° C. | | | |
| Tensile @ Break psi | 1880 | 5985 | 6710 |

[1] Tested @ 2 in/min. rate.

TABLE VII

50% Mica Filled Polypropylene Composites

| EXAMPLES | Q | 13 |
|---|---|---|
| PP-PM | 100 | 100 |
| Mica (Grade 200HK) | 100 | 100 |
| Additive I | — | 1.5 |
| Additive II | — | 0.1 |
| Tensile @ Break[1] psi | 4000 | 6150 |
| Flexural Yield Strength, psi | 6250 | 9070 |
| Tangent Flexural Modulus, psi × 10³ | 1320 | 1430 |
| HDT @ 264 psi, °C. | 120 | 136 |

[1] Tested @ 2 in/min. rate.

TABLE VIII

50% Mica Filled Polypropylene Composites

| EXAMPLES | R | 14 |
|---|---|---|
| PP—PM | 100 | 100 |
| Mica (Grade 200HK) | 100 | 100 |
| Additive I | — | 1.5 |
| Additive II | — | 0.1 |
| Before Heat Aging | | |
| Tensile @ Break[1] psi | 4000 | 6150 |
| After Heat Aging 1 Week @ 150° C. | | |

TABLE VIII-continued

50% Mica Filled Polypropylene Composites

| EXAMPLES | R | 14 |
|---|---|---|
| Tensile @ Break[1] psi | 4380 | 7080 |

[1]Tested @ 0.2 in/min. rate.

TABLE IX

50% Mica Filled Polypropylene Composites
(Heat Aging @ 150° C.)

| EXAMPLES | S | T | 15 |
|---|---|---|---|
| PP—PM | 100 | 100 | 100 |
| Mica (Grade 200HK) | 100 | 100 | 100 |
| Additive III | — | 1.0 | 1.0 |
| FRG I | — | — | 0.1 |
| Before Heat Aging | | | |
| Tensile @ Break[1] psi | 5440 | 4710 | 5720 |
| After Heat Aging 1 Week @ 150° C. | | | |
| Tensile @ Break[1] psi | 2350 | 3600 | 5720 |

[1]Tested @ 0.2 in/min. rate.

TABLE X

50% Mica Filled Polypropylene Composites
(Heat Aging @ 150° C.)

| EXAMPLES | U | 16 |
|---|---|---|
| PP—PM | 100 | 100 |
| Mica (Grade 200HK) | 100 | 100 |
| Stabilizer I | 1.5 | 1.5 |
| Additive I | — | 2.0 |
| FRG I | 0.25 | 0.25 |
| Before Heat Aging | | |
| Tensile @ Break[1] psi | 4500 | 5900 |
| After Heat Aging 1 Week @ 150° C. | | |
| Tensile @ Break[1] psi | 2570 | 7190 |

[1]Tested @ 0.2 in/min. rate.

TABLE XI

50% Mica Filled HDPE Composites

| EXAMPLES | V | W | X | Y |
|---|---|---|---|---|
| HDPE | 100 | 100 | 100 | 100 |
| Mica (Grade 200HK) | 100 | 100 | 100 | 100 |
| FRG I | — | 0.1 | 0.15 | 0.2 |
| Tensile @ Break[1] psi | 3510 | 3360 | 4110 | 5030 |
| Flexural Yield Strength, psi | 5080 | 4840 | 5750 | 6800 |
| Tangent Flexural Modulus, psi × 10³ | 510 | 480 | 510 | 650 |
| Notched Izod Impact Strength Ft-Lbs/In. | 0.23 | 0.23 | 0.16 | 0.22 |

[1]2 in/min test rate.

TABLE XII

50% Mica Filled HDPE Composites

| EXAMPLES | Z | 17 | 18 | 19 |
|---|---|---|---|---|
| HDPE | 100 | 100 | 100 | 100 |
| Mica (Grade 200HK) | 100 | 100 | 100 | 100 |
| Additive I | 2.0 | 1.0 | 2.0 | 2.0 |
| FRG I | — | 0.1 | 0.1 | 0.15 |
| Tensile @ Break[1] psi | 4020 | 5690 | 4720 | 5210 |
| Flexural Yield Strength, psi | 5480 | 6860 | 5890 | 6430 |
| Tangent Flexural Modulus, psi × 10³ | 520 | 490 | 460 | 500 |
| Notched Izod Impact Strength Ft-Lbs/In. | 0.19 | 0.21 | 0.23 | 0.27 |

[1]2 in/min test rate.

TABLE XIII

50% Mica Filled HDPE Composites

| EXAMPLES | 20 | 21 | 22 |
|---|---|---|---|
| HDPE | 100 | 100 | 100 |
| Mica (Grade 200HK) | 100 | 100 | 100 |
| Additive III | 2.0 | 2.0 | 2.0 |
| FRG I | 0.1 | 0.15 | 0.2 |
| Tensile @ Break[1] psi | 4900 | 5160 | 5530 |
| Flexural Yield Strength, psi | 6210 | 7010 | 7260 |
| Tangent Flexural Modulus, psi × 10³ | 460 | 570 | 590 |
| Notched Izod Impact Strength Ft-Lbs/IN. | 0.23 | 0.27 | 0.27 |

[1]2 in/min. test rate.

We claim:

1. A method of reinforcing a thermoplastic organic polymer which comprises blending said thermoplastic organic polymer with a reinforcing filler mixture comprising of:
   (a) from 80 to 99 weight percent, based on the weight of the reinforcing filler mixture, of an inorganic filler;
   (b) from 0.05 to 15 weight percent, based on the weight of the reinforcing filler mixture, of a polymerizable unsaturated organic compound having at least two polymerizable unsaturation groups;
   (c) from 0.05 to 5 weight percent, based on the weight of the reinforcing filler mixture, of a vinyl-polymerizable unsaturated, hydrolyzable silane;
   (d) from 0.05 to 2.5 weight percent, based on the weight of the reinforcing filler mixture, of a surfactant comprising
      (i) a siloxane containing at least one silicon-bonded alkyl group having at least 12 carbon atoms; or
      (ii) a polyoxyalkylene compound having one or more polyoxyalkylene blocks each bonded at one end to a siloxane block, an alkyl group having at least 12 carbon atoms, or an alkenyl group, and bonded at the other end to an alkoxy group, siloxane block or a hydroxy group; and
   (e) from 0.0025 to 2.5 weight percent, based on the weight of the reinforcing filler mixture, of a free radical generator, to form a substantially homogeneous mixture.

2. The method of claim 1 wherein the reinforcing filler mixture is from about 5 to 85 percent by weight, based on the filled thermoplastic polymer blend.

3. The method of claim 1 wherein the reinforcing additives are integrally blended.

4. The method of claim 1 wherein the filler is mica.

5. The method of claim 1 wherein the polymerizable unsaturated organic compound having at least two polymerizable unsaturation groups is selected from the group consisting of the tri-, tetra-, and penta-acrylates of poly(vinyl alcohol), pentaerythritol, methylolpropane, and dipentaerythritol and the tri-, tetra-, and penta-methacrylates of pentaerythritol, methyolpropane and dipentaerythritol.

6. The method of claim 1 wherein the vinyl-polymerizable unsaturated, hydrolyzable silane is selected from the group consisting of gamma-methacryloxypropyl-trimethoxysilane, vinyltriethoxysilane, vinyltri(2-methoxyethoxy) silane, vinyltrimethoxysilane, vinyltrichlorosilane, gamma-acryl-oxypropyltriethoxysilane, vinyltriacetoxysilane, ethynytriethoxysilane, and 2-propynyltrichlorosilane.

7. The method of claim 1 wherein the free radical generator is selected from the group consisting of dicumyl peroxide, lauroyl peroxide, azobisisobutyronitrile, benzoyl peroxide, tertiary butyl perbenzoate, di(tertiary-butyl) peroxide, cumene hydroperoxide, 2,5-dimethyl-2,5-di(t-butylperoxy)hexane, 2,5-dimethyl-2,5-di(t-butylperoxy)hexane, teritary butyl hydroperoxide, and isopropyl percarbonate.

8. The method of claim 1 wherein the thermoplastic organic polymer is in particulate solid form when blended with the reinforcing filler mixture.

9. The method of claim 1 wherein the thermoplastic organic polymer is in molten form when blended with the reinforcing filler mixture.

10. The method of claim 1 wherein the thermoplastic organic polymer is either polyethylene or polypropylene.

11. A reinforcing additive for use in a reinforcing inorganic filler mixture, said reinforcing additive comprising:
    (a) a polymerizable unsaturated organic compound having at least two polymerizable unsaturating groups;
    (b) a vinyl-polymerizable unsaturated, hydrolyzable silane;
    (c) a surfactant comprising
        (i) a siloxane containing at least one silicon-bonded alkyl group having at least 12 carbon atoms; or
        (ii) a polyoxyalkylene compound having one or more polyoxyalkylene bocks each bonded at one end to a siloxane block, an alkyl group having at least 12 carbon atoms, or an alkenyl group, and bonded at the other end to an alkoxy group, a siloxane block or a hydroxy group; and
    (d) a free radical generator.

12. The additive of claim 11 wherein the polymerizable unsaturated organic compound having at least two polymerizable unsaturation groups is selected from the group consisting of the tri-, tetra-, and penta-acrylates of poly(vinyl alcohol), pentaerythritol, methylolpropane, and dipentaerythritol and the tri-, tetra-, and penta-methacrylates of pentaerythritol, methylolpropane and dipentaerythritol.

13. The additive of claim 11 wherein the vinyl-polymerizable unsaturated, hydrolyzable silane is selected from the group consisting of gamma-methacryloxypropyltrimethoxysilane, vinyltriethoxysilane, vinyltri(2-methoxyethoxy) silane, vinyltrimethoxysilane, vinyltrichlorosilane, gamma-acryl-oxypropyltriethoxysilane, vinyltriacetoxysilane, ethynytriethoxysilane, and 2-propynyltrichlorosilane.

14. The additive of claim 11 wherein the free radical generator is selected from the group consisting of dicumyl peroxide, lauroyl peroxide, azobisisobutyronitrile, benzoyl peroxide, tertiary butyl perbenzoate, di(tertiary-butyl) peroxide, cumene hydroperoxide, 2,5-dimethyl-2,5-di(t-butylperoxy)hexane, 2,5-dimethyl-2,5-di(t-butylperoxy)hexane, teritary butyl hydroperoxide, and isopropyl percarbonate.

15. A filled organic polymer composition comprising a thermoplastic organic polymer, an inorganic filler and the reinforcing additive of claim 11.

16. A filled organic polymer composition comprising a thermoplastic organic polymer, an inorganic filler, and the reinforcing additive of claim 12.

17. A filled organic polymer composition comprising a thermoplastic organic polymer, an inorganic filler, and the reinforcing additive of claim 13.

18. A filled organic polymer composition comprising a thermoplastic organic polymer, an inorganic filler, and the reinforcing additive of claim 14.

* * * * *